United States Patent Office 2,981,235
Patented Apr. 25, 1961

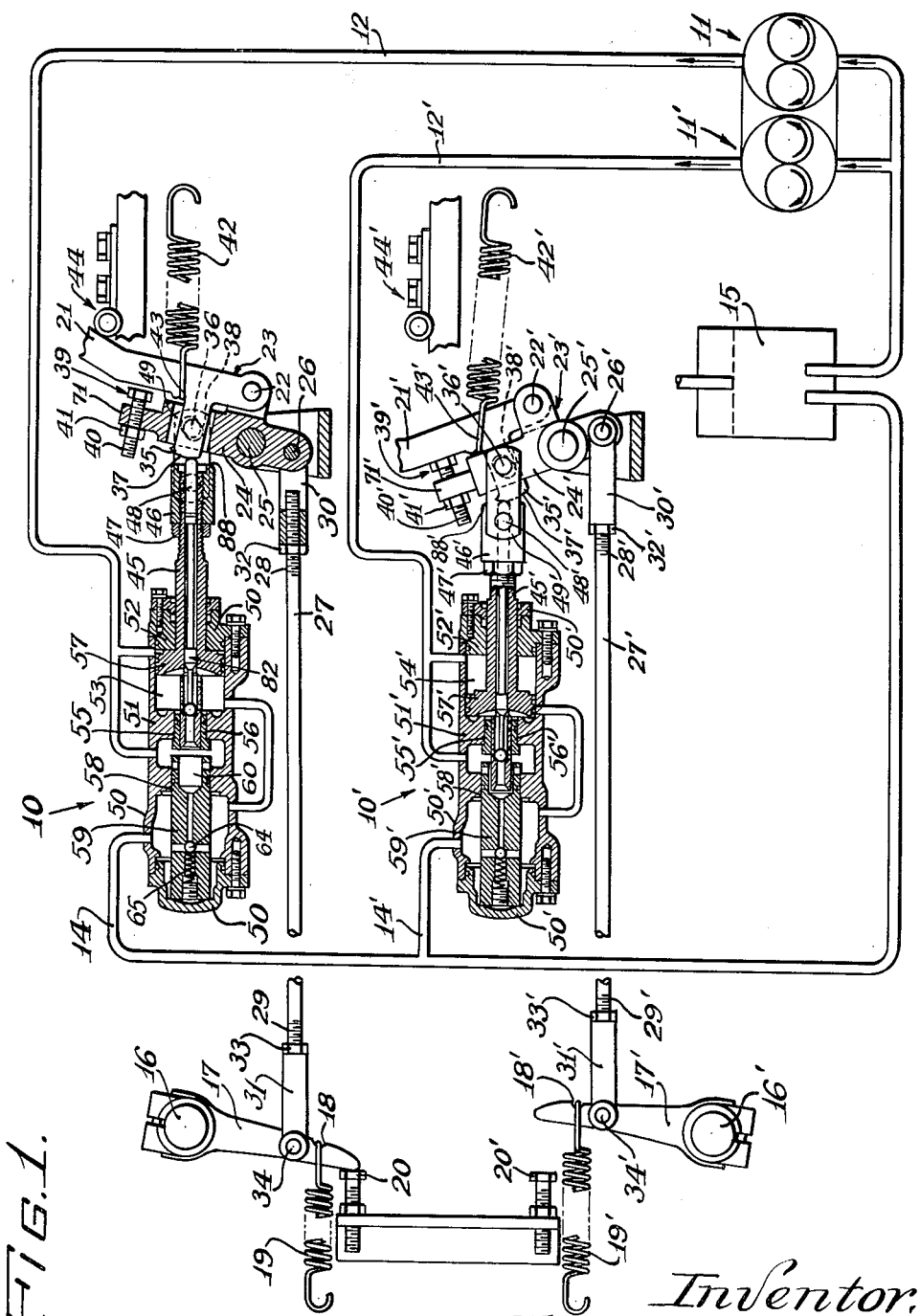

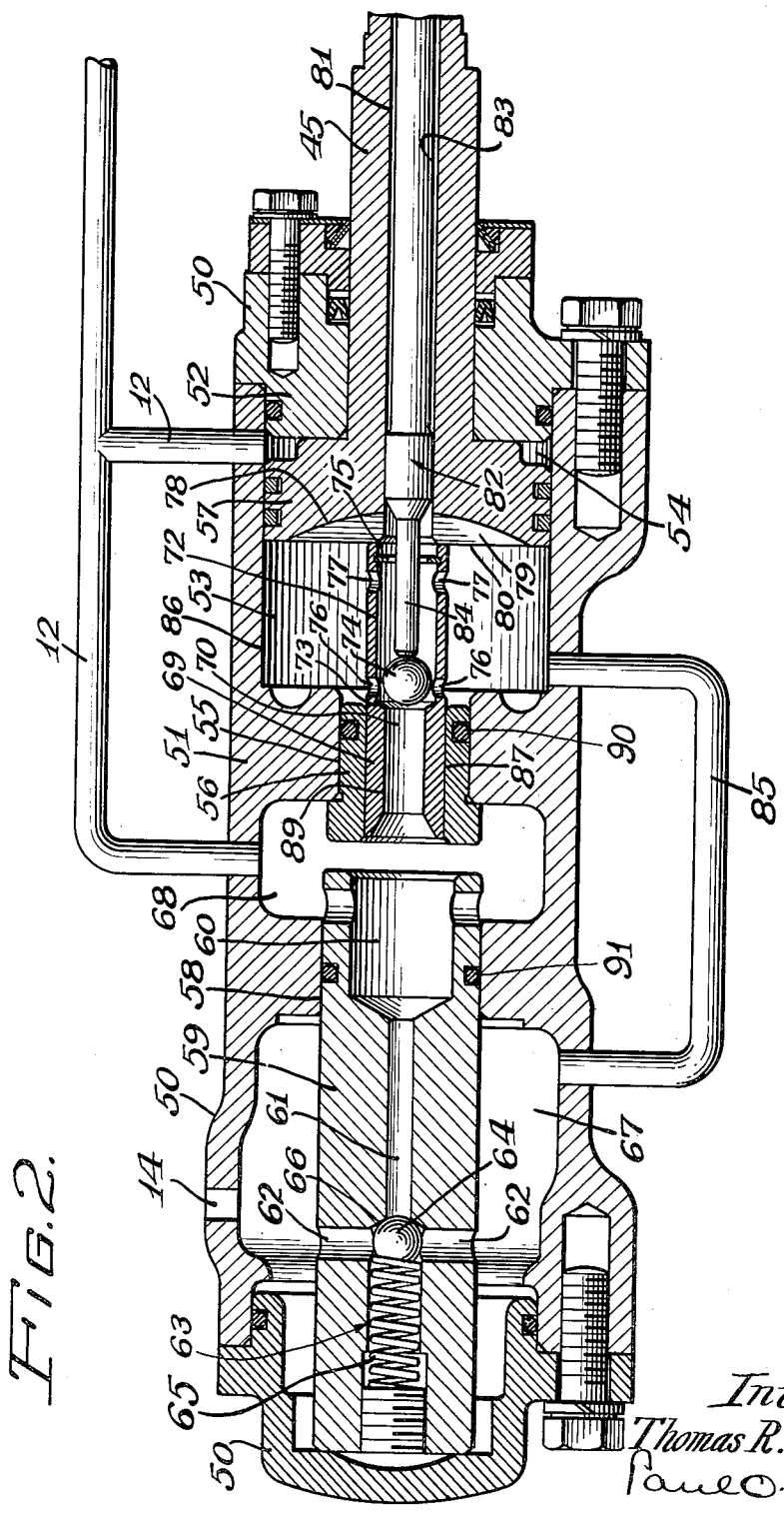

2,981,235

HYDRAULICALLY POWERED STEERING CONTROLS FOR STEERING-BY-DRIVING VEHICLES

Thomas R. Seddon, Roselle, Ill., assignor to International Harvester Company, a corporation of New Jersey Filed May 29, 1956, Ser. No. 588,005

9 Claims. (Cl. 121—41)

This invention relates to power driven vehicles of the kind which are steered by driving. More in particular this invention concerns vehicles steered by independent control of the drive means for the ground engaging elements disposed on opposite sides of the vehicle.

Particularly in endless type track vehicles such as crawler tractors, steering is accomplished by controlling the relative rates of movement of the endless track ground engaging elements on each side of the vehicle. One type of construction employs a differential drive to the track elements and steering is effected by braking one track element thus changing the course of direction of the vehicle's travel. Another type of construction interposes a pair of coupling devices such as friction clutches and the like, one being disposed in the drive means to each of the track elements. Thus when both coupling devices are fully engaged the track elements move in unison and the vehicle proceeds in a straight course. To change the vehicle's course one of the coupling devices is either partly or totally disengaged which reduces or terminates the relative speed of the associated track element. Still another type of construction employs a combination of both coupling and brake means associated with each of the ground engaging elements.

Particularly in the larger type vehicles the coupling or braking means associated with the steering-by-driving mechanism requires considerable force to actuate the coupling or braking means such that if the required force is provided solely from manual effort the operator tends to become unduly fatigued. It is therefore a prime object of this invention to provide a simplified construction of an improved power operated steering-by-driving control means whereby the physical effort required of the operator is substantially reduced to eliminate undue fatigue.

It is another object of this invention to provide a simplified construction of fluid power means for actuating the steering-by-driving mechanism of a vehicle whereby the physical effort required of the operator is limited substantially to the nominal force necessary to operate the control valve means associated with said fluid power means.

Still another object of this invention is to provide safety means for manually actuating the steering-by-driving mechanism in the event of failure of the source of fluid under pressure associated with the fluid power means of this invention.

A further object of this invention is to provide a fluid power means for actuating the steering-by-driving mechanism of a vehicle having a much simplified and low cost construction whereby no operative spring means are employed and leakage of fluid is eliminated or at least minimized.

A yet further object of this invention is to provide a fluid power actuating means according to the preceding objects whereby a snubbing mechanism is employed to dampen the rate of movement of said power means when it approaches the limit of its power stroke.

These and other important and desirable objects inherent and encompassed by the invention are further evident in the ensuing description of a preferred embodiment, the appended claims and the annexed drawings wherein:

Figure 1 is a side view, partly in section and partly diagrammatic, illustrating right and left side fluid power means for actuating the drive coupling devices on the respective sides of the vehicle, the lower or left side unit shown in operating position while the upper or right side unit is in a non-operating position.

Figure 2 is an enlarged side view, in section partly broken away, illustrating in detail the construction of one fluid power unit embodying the invention.

Referring to Figure 1 there is illustrated a pair of fluid power units or servo-motors of this invention, the top unit generally indicated at 10, serves to actuate or control the coupling or braking device of the drive to the ground engaging elements on the right hand side of the vehicle (not shown). Similarly 10' generally indicates a second fluid power unit which serves to actuate or control the coupling or braking device of the drive to the ground engaging elements on the left side of the vehicle. Since the construction of both left and right power units comprising this invention are identical for simplicity like parts for both left and right units bear the same numerical designations except that the numerals relating to the left unit are primed. Therefore only the first or right side power unit of this invention is described herein and it will be understood that the construction of the second or left side power unit is the same.

The pump 11 mounted on the vehicle is a source of fluid under pressure delivered to the servo-motor 10 through the fluid pressure conduit 12. The fluid discharge conduit 14 is provided as a return means of the fluid back to the pump 11. For convenience and economy the conduits 14 and 14' may be connected together and returned to pumps 11 and 11' through a common reservoir 15. It will be understood that the return conduits 14 and 14' and the reservoir 15 may be eliminated if the fluid used is a gas such as air under pressure.

The numeral 16 designates a rotative shaft of an actuator mechanism (not shown) which controls the engagement or disengagement of a clutch or coupling device (not shown) interposed in the drive train of the vehicle to the corresponding ground-engaging element. An actuator arm 17 is rigidly secured to the shaft 16 for rotative movement therewith. A hook portion 18 of the arm 17 is connected to a spring 19 for urging the arm 17 and associated actuator shaft 16 into position for causing complete engagement of the coupling device for driving connection between the vehicle's power source and the associated ground-engaging element. Thus the spring 19 reduces backlash and assists in overcoming any slight tendency of movement of the servo-motor 10 caused by fluid movement therethrough. Stop means 20 mounted on the vehicle may be provided for limiting the rotative movement in the direction for engagement of the coupling device. Thus it will be noted from Figure 1, with the right side actuator mechanism as shown by the position of arm 17, that the right-hand ground-engaging element is drivingly connected with the vehicle's power plant. It will also be noted, with the left side actuator mechanism as shown by the position of arm 17' with respect to the stop 20', that the left side coupling device is disengaged and therefore the left side ground-engaging element is not in driving connection with the vehicle's power plant.

A manually operable control lever 21 (partly shown) is pivotally mounted at 22 on one leg of a rock arm 24 of a linkage assembly generally indicated at 23. The linkage assembly 23 may comprise a rock arm 24 pivotally mounted to a stub shaft 25 which stub shaft is suitably mounted on the vehicle. A second leg of the rock arm 24 is pivotally connected at 26 to a bifurcated lug 30. The lug 30 is provided with a left-hand threaded bore adapted to receive a left-hand threaded end portion 28 of a rod 27. A left-hand threaded locking nut 32 is provided on threads 28 in abutting relation to the lug 30 to prevent rotative movement of the rod 27. The other end of rod 27 is provided with a right-hand threaded portion 29 received into a right-hand threaded bore of a bifurcated lug 31. The bifurcated portion of the lug 31 is pivotally connected to the actuator arm 17 at 34. A right-hand threaded locking nut 33 is provided on the threaded portion 29 in abutting relation to lug 31 to further prevent rotative movement of the rod 27. From this it can be seen that the relative distance between the lugs 30 and 31 is adjustable by first loosening the nuts 32 and 33 and rotating the rod 27 to the desired adjusted distance between the lugs 30 and 31 and thereafter tightening nuts 32 and 33 to prevent the further rotation of the rod 27.

A third or upper leg 71 of the rock arm 24 is of bifurcated construction and is provided with a shaft 36 extending laterally through the bifurcation and protrudes beyond the outer surfaces thereof. A protruding arm 35 of the control lever 21 is pivotally connected to the shaft 36 between the bifurcations of the rock arm 24. The arm 35 is provided with a curved surface 37 for a purpose described later. The pivotal connection of the arm 35 to the shaft 36 may conveniently be provided by means of an elongated laterally disposed bore 38 in the arm 35. The elongated bore 38 thus permits a limited rotative movement of the control lever 21 about the pivot 22. An adjustable stop means generally indicated at 39 is provided adjacent the top of the upper leg 71 of the rock arm 24 to limit adjustably the relative movement of the control lever 21 with respect to the rock arm 24. The stop 39 may be comprised of a bolt 40 threadedly fit into a bore in the top portion of the upper leg 71 of the rock arm 24. The head portion of the bolt 40 is positioned for abutment against the control lever 21 as shown in the lower illustration of Figure 1. A locking nut 41 is provided for locking the bolt 40 against rotative movement to maintain adjustment of the stop 39.

A spring 42 suitably anchored to the vehicle is connected to the control lever 21 at 43 for urging the control lever 21 in a rearward direction as shown in Figure 1. Another stop generally indicated at 44 is mounted suitably on the vehicle to limit the rearward movement of the control lever 21.

The servo-motor 10 is provided with a movable work member 45 one end of which is threadedly fitted into a bore of an adjustable cap nut 46. The outer end or head portion of the cap nut 46 may be provided with a curved surface 88 for a purpose described later. A locking nut 47 is provided on the work member 45 in abutting relation to the cap nut 46 to prevent rotative movement of the cap nut 46. The cap nut 46 is provided with a pair of oppositely disposed stub shafts one of which is shown at 48'. A pair of link elements one of which is shown at 49' are disposed on opposite sides of the cap nut 46 and are pivotally connected to the stub shafts 48 thereof. The other end of the link elements 49 are pivotally connected to the outer protruding end portions of the shaft 36. Thus from the above, movable link means from the work member 45 and control lever 21 to the actuator arm 17 have been established.

The construction of the servo-motor 10 in this invention has many advantages and improvements over the construction of the servo-motor shown and described in a copending patent application of Lauri J. Kivisto and myself, Serial No. 525,219 filed on July 29, 1955 and assigned to the assignee herein, now Patent No. 2,897,787.

The servo-motor 10 comprises a casing 50 having a front end wall 51 and a rear end wall 52 respectively disposed adjacent a front cylinder chamber 53 and a rear cylinder chamber 54. At this point it should be understood that the housing 50 may comprise a plurality of parts bolted or otherwise connected together for convenience in manufacture and assembly. A first or internal bore 55 is disposed axially in the front end wall 51 of the casing 50 and is adapted to receive in snug but slidably fit relation a bushing 56. A sealing ring 90 is provided on the bushing 56 to prevent leakage of fluid thereby. A piston 57 is integrally mounted on the work member 45 and is adapted to reciprocate between or within the front and rear cylinder chambers 53 and 54 in a commonly known manner. A second bore 58 is disposed axially in the casing 50 and is adapted to receive in snug fit relation a receptacle member 59. A sealing ring 91 is provided on the member 59 to prevent leakage of fluid thereby. The receptacle member 59 is provided with an enlarged recessed portion 60 at one end and is provided with a longitudinally disposed conduit 61 which intersects a plurality of laterally disposed conduits 62 as shown in Figure 2. At the juncture of the conduits 62 with the conduit 61 is a relief valve generally indicated at 63. The ball 64 of the relief valve 63 is urged rearwardly by the spring 65 into seating relation with the receptacle member 59 and 66. Thus the appropriate selection of the spring 65 predetermines the fluid pressure in the conduit 61 necessary to unseat the ball 64 thereby limiting to a predetermined value the maximum pressure of fluid in the conduit 61.

The forward portion of the casing 50 is provided with a compartment 67 which is in continuous fluid communication with the conduits 62 and the fluid return conduit 14 as best illustrated in Figure 2. Between the bore 58 and the front end wall 51 in the casing 50 is disposed an inlet chamber 68 connected for fluid flow with the inlet conduit 12. It will be noted from Figure 2 that the forward end of the bushing 56 is spaced longitudinally from the rearward end of the receptacle member 59.

Slidably disposed in the bushing 56 is a sleeve member 69. The forward end of the sleeve member 69 is adapted for reception into the enlarged recessed portion 60 of the receptacle member 59. It will be noted that the enlarged recessed portion 60 of the receptacle member 59 is substantially larger in internal diameter than the outer diameter of the sleeve member 69 so as to provide an escape route for fluid within the recess 60 when the sleeve member 69 moves forwardly into the recess 60. The sleeve member 69 is sleeve shaped having an internal passage 70 extending longitudinally therethrough. The internal passage 70 is comprised of a relatively smaller bore 89 disposed in the forward portion of the sleeve member 69 and a slightly larger bore 72 disposed in the rearward portion thereof as shown best in Figure 2. The juncture of the bores 89 and 72 forms a shoulder or valve seat 73 adapted to accommodate the ball 74 or valve element of the sleeve member 69 in seating relation. From Figure 2 it can be appreciated that the diameter of the ball 74 is larger than the diameter of the bore 89 and smaller than the bore 72. At the rearward end portion of the sleeve member 69 is an internally disposed snap ring 75 which serves to prevent the ball 74 from rearward movement beyond the snap ring 75. The rearward end portion of the sleeve member 69 is in abutting relation with the forward face of the piston 57. A plurality of radially spaced holes or apertures 76 and 77 are disposed in the rearward portion of the sleeve member 69 as best shown in Figure 2. The holes 76 and 77 are for the purpose of providing fluid communication between the bore 72 and the front cylinder chamber 53. The holes 76 also serve an additional purpose to be described later. It will be noted from Figure 2 that the forward face of the piston 57 may conveniently be provided with a concaved surface 78 with a series of radially spaced ribs 79 the forward edges 80 thereof being adapted for abutting relation with the rearward end of the sleeve member 69.

The work member 45 is provided with an axial or longitudinal third bore 81 therethrough which bore extends through the piston 57. In the bore 81 is slidably fitted a valve control member generally indicated at 82. A portion of the valve control member 82 between the ends thereof may be of reduced diameter 83 to minimize friction of the longitudinal movement of the member 82 with respect to the work member 45. The forward end portion of the valve control member 82 is of reduced diameter to form the pin 84 which pin may freely pass through the internal opening of the snap ring 75. The diameter of the internal opening of the snap ring 75 should be appreciably greater than the diameter of the pin 84 so as to permit flow of fluid thereby. The length of the pin 84 should be sufficient so that the extreme forward end of the pin 84 may engage the ball 74 to cause the seating of the ball 74 against the valve seat 73. The extreme rearward end of the control valve member 82 is in abutting relation to the curved surface 37 of the arm 35 so that a forward movement of the control lever 21 causes forward movement relative to the work member 45 of the control valve member 82 to seat the ball 74 against the valve seat 73.

In order to provide fluid exhaust means for the front cylinder chamber 53 an open tube or conduit 85 is connected for fluid flow between the front cylinder chamber 53 and compartment 67. Fluid exhaust from the rear cylinder chamber 54 passes through the conduit 12 when the system is under low fluid pressure as will be subsequently explained.

*Operation*

Referring to the upper or right side servomotor 10 of Figure 1, it will be seen that this servo-motor 10 is not in operation and therefore the right side coupling drive is engaged for driving the ground-engaging traction means on the right side of the vehicle. In this condition the fluid from the pressure side of the pump 11 enters the inlet chamber 68 through the conduit 12, thence through the internal passage 70 of the sleeve member 69. The fluid from the passage 70 unseats the ball 74 from the valve seat 73 because the valve control member 82 is relaxed thus permitting the fluid to pass through the holes 76 and 77 into the front cylinder chamber 53. From the chamber 53 the fluid passes through the conduit 85 into the compartment 67 and out to the reservoir 15 through the discharge conduit 14. Thus in this neutral condition the fluid is bypassed through the servo-motor 10 to the reservoir 15 at low pressure. Since the pressure in the conduit 12 is of low magnitude the fluid pressure in the rear cylinder chamber 54 is of low magnitude no forward movement of the piston 57 will occur as the fluid pressure in both chambers 53 and 54 is substantially the same.

Now suppose the operator desires to disengage the coupling device, either partly or totally, to affect the drive connection to the associated ground-engaging element. He moves the control lever 21 forwardly using a light but continued forward force. The elongated holes or bores 38 in protruding arm 35 of the lever 21 allows initial forward movement of the lever 21 to abut the stop 39. This causes the curved surface 37 of the arm 35 abutting the one outwardly projecting end of the valve control member 82 to move the member 82 forwardly in relation to the work member 45. The forward movement of this valve control member 82 moves the pin 84 into abutting relation with the ball 74, causing the ball 74 to seat against the valve seat 73 thus terminating or restricting the flow of fluid from the passage 70 into the front cylinder chamber 53. It can be readily appreciated that the urging of the ball 74 in a direction to seat against the valve seat 73 by the pin 84 may be less than that required to completely seat the ball 74. Under such condition the restriction of fluid past the seat 73 and ball 74 causes a corresponding pressure differential between the fluid in the passage 70 and the chamber 53.

As soon as the ball 74 is moved forwardly sufficiently to terminate or restrict the flow of fluid from the passage 70 to the chamber 53 a corresponding pressure increase occurs in the inlet chamber 68, conduit 12 and the rear cylinder chamber 54. The increased fluid pressure in the rear cylinder chamber 54 urges the piston 57 and associated work member 45 in a forward direction. As the piston 57 moves forwardly the sleeve member 69 is also moved forwardly by the piston 57. Thus the forward end portion of the sleeve member 69 recedes into the enlarged recessed portion 60 of the receptacle member 59. Now as the sleeve member 69 moves forwardly the holes 76 are initially covered by registration with the bushing 56. However, as the piston 57 approaches the limit of its forward stroke, the holes 76 of the sleeve member 69 begin to emerge from the forward end of the bushing 56 in the inlet chamber 68 which allows fluid under pressure in the chamber 68 to escape past the seated ball 74 into the larger bore 72 of the sleeve member 69 thereby bypassing fluid from the chamber 68 into the front cylinder chamber 53. This by-passing causes a fluid pressure decrease in the inlet chamber 68, conduit 12 and rear cylinder chamber 54 which snubs the forward movement of the piston 57, and also relieves pump 11 from unnecessary load. This snubbing action prevents the forward face or baffled edges of the piston 57 from striking the front end wall 51 of the housing 50 thereby preventing damage to the piston 57 or housing 50. The snubbing action also minimizes the necessity of operation of the relief valve 63. The position of the work member 45, piston 57 and sleeve member 69 in operating position are illustrated in the left side unit of Figure 1.

Now again referring to the left side unit of Figure 1 if the operator releases the control lever 21 the pressure of the fluid in passage 70 immediately unseats the ball 74 and thus re-establishes the by-pass flow described previously for neutral condition and the springs 42 and 19 together with the load on the actuator shaft 16 urges the piston 57 and work member 45 rearwardly through the associated linkages previously described. The slight pressure differential between inlet chamber 68 and the front cylinder chamber 53 causes a piston-like action on the annular surface at the forward end of the sleeve member 69 which in turn causes the sleeve member 69 to move rearwardly to follow and abut the front face of the piston 57, thus returning to the position illustrated in Figure 2. It can be appreciated that the force necessary to move the member 69 rearwardly is small in order to overcome merely the friction between the element 69 and bushing 56.

From the above it is evident that the cylinder bore 86 is not necessarily in exact axial alignment with bore 55 or the internal bore 87 of the bushing 56. Nor is it necessary that the bore 81 be in accurate axial alignment with either the bores 86, 87 or 55. Thus the cost of close or accurate tolerance machining is avoided in this invention. Furthermore the employment of operating springs and their attendant inconsistencies are eliminated in the servo-motor of this invention. In this connection the spring 65 of the relief valve 63 only functions when the fluid pressure in the system exceeds a predetermined limit thereby relieving the system from excessive pressure. It should also be noted leakage of fluid between the valve control member 82 and its associated bore 81 in the work member 45 is minimized as it is never subjected to high fluid pressures.

In the event that for any reason a failure occurs in the source of fluid pressure it is essential that provision be included for operating the coupling device by manual effort. In the embodiment of the invention described, should fluid pressure failure occur, the operator merely applies the necessary manual force forwardly on the control lever 21. The curved surface 37 on the arm 35 of the lever 21 moves the valve control member 82 until the curved surface 37 abuts the outer end curved surface 88 of the cup nut 46 thus engaging for forward movement the work member 45, or in the alternative the link elements 49 may drive the work member 45 forwardly. It will be appreciated that in the absence of fluid pressure from the pump 11 the piston 57 may be moved freely as both cylinder chambers 53 and 54 are vented through conduits 85 and 12 respectively. The linkage means connecting the lever 21 with the actuator shaft 16 allows corresponding actuation of the shaft 16 by manual movement of the lever 21. Thus in the event of fluid pressure failure steering of the vehicle by manual effort may be accomplished with negligible resistance from the inoperative servo-motor 10.

Having thus described an embodiment of the invention, it can now be seen that the objects of the invention have been fully achieved and it must be understood that changes and modifications may be made which do not depart from the spirit of the invention nor upon the scope thereof as defined in the appended claims.

What is claimed is:

1. A fluid operated servo-motor comprising a casing, a reciprocable work member including a piston disposed in the rearward portion of said casing, a front cylinder chamber and a rear cylinder chamber disposed in the rearward portion of said casing, a front end wall and a rear end wall disposed in said casing, one end of said work member projecting through said rear end wall, a first bore axially disposed in said front end wall, a bushing disposed in said first bore, an inlet chamber disposed in said casing, said inlet chamber being positioned adjacent to and forwardly of said front end wall, a sleeve member disposed in said casing and adapted for slidable movement axially in said bushing, said sleeve member being provided with internal fluid passage means extending longitudinally therethrough, a plurality of transverse holes disposed in the rearward portion of said sleeve member, a valve seat disposed forwardly of said holes in said sleeve member, a ball disposed in said sleeve member and adapted for seating against said valve seat for restricting the flow of fluid through said internal passage, at least one of said holes being positioned for selective registration with said inlet chamber and said front cylinder chamber, the rearward end of said sleeve member being adapted for engagement in abutting relation with said work member, a second bore axially disposed in said casing adjacent to and forwardly of said inlet chamber, a receptacle member disposed in said second bore, the rearward end portion of said receptacle member being provided with a recessed portion adapted to receive the forward end portion of said sleeve member, a compartment disposed in the forward portion of said casing, conduit means disposed in said receptacle member communicatively connecting said inlet chamber with said compartment, a relief valve interposed in said conduit means, said relief valve being adapted to open for discharging fluid from said inlet chamber to said compartment when fluid pressure in said inlet chamber exceeds a predetermined value, a source of fluid under pressure including fluid return means, a fluid discharge conduit communicatively connecting said compartment with said fluid return means of said source of fluid under pressure, an open fluid pressure conduit communicatively connecting said inlet chamber and said rear cylinder chamber with said source of fluid under pressure, an open tube communicatively connecting said front cylinder chamber with said compartment, a third bore axially disposed in said work member, an externally mounted manually operable control lever, a valve control member slidably disposed in said third bore, one end of said valve control member projecting rearwardly of said work member and engageable for axial movement in a forward direction with said control lever, the other end of said valve control member being positioned to engage said ball in abutting relation for seating said ball in said valve seat of said sleeve member responsive to forward movement of said control lever and said valve control member to restrict flow of fluid thereby for urging said sleeve member and work member forwardly until at least one of said holes in said sleeve member communicatively registers with said inlet chamber to re-establish fluid communication between said inlet chamber and said front cylinder chamber thereby snubbing the forward movement of said work member and alternately disengaging said ball from said valve seat of said sleeve member to re-establish fluid flow thereby to de-energize said work member when rearward movement of said valve control member is unrestrained.

2. A fluid operated servo-motor comprising a casing, front cylinder chamber and a rear cylinder chamber disposed in a portion of said casing, a reciprocable piston disposed between said chambers, a work member associated with said piston and adapted for reciprocation therewith, a control lever mounted externally of said casing, one end of said work member projecting through said casing, an inlet chamber disposed in said casing, an internal bore disposed within said casing extending from said front cylinder chamber to said inlet chamber, a sleeve member slidably disposed in said internal bore, the rearward end of said sleeve member being positioned to engage said piston in abutting relation, a valve element disposed in said sleeve member, an internal fluid passage disposed within said sleeve member, a plurality of transverse holes disposed in the rearward portion of said sleeve member positioned to communicate for fluid flow said internal passage with said front cylinder chamber, a valve control member slidably disposed axially in said piston and associated work member, one end of said valve control member projecting externally of said work member and engageable with said control lever in abutting relation, the other of said valve control member being positioned to engage in abutting relation said valve element for restricting the flow of fluid from said inlet chamber to said front cylinder chamber, a compartment disposed in said casing, a source of fluid pressure mounted externally of said casing, an open fluid pressure conduit communicatively connecting said source of fluid under pressure with said rear cylinder chamber and said inlet chamber, a fluid discharge conduit communicatively connecting the inlet side of said source of fluid under pressure with said compartment, an open tube communicatively connecting said front cylinder chamber with said compartment, said piston and associated work member being urged in a forward direction responsive to engagement in a forward direction of said valve control member with said valve element to restrict the flow of fluid from said inlet chamber to said front cylinder chamber until at least one of said transverse holes of said sleeve member registers with said inlet chamber thereby re-establishing flow of fluid from said inlet chamber to said front cylinder chamber for snubbing the forward movement of said piston and associated work member.

3. A one-way acting servo-motor comprising a casing having a reciprocable work member including a piston therein, one end of said work member projecting through said casing, a front cylinder chamber disposed in said casing adjacent one side of said piston and a rear cylinder chamber disposed adjacent the opposite side of said piston, an open fluid pressure conduit communicatively connecting for fluid flow said rear cylinder chamber with said source of fluid under pressure, a compartment disposed in said casing, a fluid discharge conduit communicatively connecting said compartment with the inlet side of said source of fluid under pressure, an open tube communicatively connecting for fluid flow said front cylinder chamber with said compartment, an inlet chamber disposed in said casing communicatively connected for fluid flow with said source of fluid under pressure, a manually operable control lever mounted externally of said casing, a valve control member slidably disposed for axial movement in said work member, one end of said valve control member extending outside said work member and being operatively associated with said control lever, a movable sleeve member disposed in said casing, the rearward end of said sleeve member being positioned to engage said piston in abutting relation, an internal fluid passage disposed in said sleeve member adapted to communicate for fluid flow said inlet chamber with said front cylinder chamber, a valve element disposed in said sleeve member, said valve element being engageable with said sleeve member for restricting flow of fluid from said inlet chamber to said front cylinder chamber, the other end of said valve control member being engageable with said valve element in abutting relation, means for snubbing the forward movement of said piston and work member when said piston approaches the limit of its forward stroke, said servo-motor being energized for urging said piston and work member in a forward direction when said valve control member is moved forwardly thereby engaging said valve element with said sleeve member to restrict flow of fluid from said inlet chamber to said front cylinder chamber and alternately when said valve control member is unrestrained for disengaging said valve element from said sleeve member whereby fluid flow from said inlet chamber to said front cylinder chamber is unrestricted thereby de-energizing said servo-motor.

4. A fluid operated servo-motor comprising a stationary casing having a reciprocable work member including a piston disposed therein, one end of said work member projecting through said casing, an open fluid pressure conduit connected to said casing positioned to communicate a source of fluid under pressure to one side of said piston, an open fluid discharge conduit communicatively connected to discharge fluid from the other side of said piston, an inlet chamber disposed in said casing communicatively connected to said fluid pressure conduit, movable valve means disposed in said casing positioned to engage said piston in abutting relation, said valve means being adapted to control the flow of fluid from said inlet chamber to the other side of said piston, means disposed in said casing for communicatively connecting for fluid flow said inlet chamber with said discharge conduit for snubbing the movement of said piston as said piston approaches the limit of its stroke in one direction, a manually operable valve control member positioned to engage in one direction said valve means for restricting the flow of fluid from said inlet chamber to the other side of said piston thereby energizing said piston in one direction and alternately allowing said valve means to open for substantially unrestricted fluid flow from said inlet chamber to the other side of said piston thereby de-energizing said piston and associated work member.

5. A one-way acting fluid operated servo-motor comprising a stationary casing, a reciprocable work member including a piston disposed axially in said casing, one end of said work member projecting outside of said casing, an inlet chamber disposed in said casing, an open fluid pressure conduit communicatively connected to one side of said piston and said inlet chamber, a source of fluid pressure communicatively connected to said conduit, an open fluid discharge conduit communicatively connected to the other side of said piston, an internal bore disposed adjacent to said inlet chamber and said other side of said piston, a movable sleeve member slidably disposed in said internal bore positioned to engage said piston in abutting relation, an internal passage disposed in said sleeve member in communicative connection with said inlet chamber and said discharge conduit, means provided in said sleeve member registerable with said internal bore for communicatively connecting for fluid flow said inlet chamber with the other side of said piston to snub the movement of said work member adjacent the end of its power stroke, externally operable valve means disposed in said sleeve member, said valve means being operable to restrict the flow of fluid through said internal passage for energizing said piston in one direction and alternately operable to discharge fluid through said internal passage for de-energizing said piston.

6. A one-way acting fluid operated servo-motor comprising a casing, a reciprocable work member including a piston disposed in the rearward portion of said casing, a front cylinder chamber and a rear cylinder chamber disposed in the rearward portion of said casing, a front end wall and a rear end wall disposed in said casing, an externally mounted manually operable control lever, one end of said work member projecting through said rear end wall, a first bore axially disposed in said front end wall, a bushing disposed in said first bore, an inlet chamber disposed in said casing, said inlet chamber being positioned adjacent to and forwardly of said front end wall, a sleeve member disposed in said casing and adapted for slidable movement axially in said bushing, said sleeve member being provided with internal fluid passage means extending longitudinally therethrough, a plurality of transverse holes disposed in the rearward portion of said sleeve member, a valve seat disposed forwardly of said holes in said sleeve member, a ball disposed in said sleeve member and positioned for seating against said valve seat for restricting the flow of fluid through said internal passage, at least one of said holes being positioned for selective registration with said inlet chamber and said front cylinder chamber, the rearward end of said sleeve member being positioned for engagement in abutting relation with said work member, a source of fluid under pressure including fluid return means, a fluid discharge conduit connected to said casing in fluid communication with said return means of said source of fluid under pressure and said front cylinder chamber, an open fluid pressure conduit communicatively connecting said inlet chamber and said rear cylinder chamber with said source of fluid under pressure, a bore axially disposed in said work member, a valve control member slidably disposed in said bore, one end of said valve control member projecting rearwardly of said work member and adapted for axial movement in a forward direction responsive to movement of said control lever, the other end of said valve control member being positioned to engage said ball in abutting relation for seating said ball in said valve seat of said sleeve member whereby forward movement of said control lever and said valve control member engages said ball with said valve seat to restrict flow of fluid thereby to urge said sleeve member and work member forwardly until at least one of said holes in said sleeve member communicatively registers with said inlet chamber to re-establish fluid communication between said inlet chamber and said front cylinder thereby snubbing the forward movement of said work member and alternately disengaging said ball from said valve seat of said sleeve member to re-establish fluid flow thereby to de-energize said work member when rearward movement of said valve control member is unrestrained.

7. A one-way acting fluid operated servo-motor comprising a casing, a front cylinder chamber and a rear cylinder chamber disposed in a portion of said casing, a reciprocable piston disposed in said chambers, a work member connected to said piston and adapted for reciprocation therewith, a control lever mounted externally of said casing, one end of said work member projecting through said casing, an inlet chamber disposed in said casing, an internal bore disposed within said casing extending from said front cylinder chamber to said inlet chamber, a sleeve member slidably disposed in said internal bore, one end of said sleeve member being positioned to engage said piston in abutting relation, a valve element disposed in said sleeve member, an internal fluid passage disposed within said sleeve member, a plurality of transverse holes disposed in one end portion of said sleeve member positioned to communicate for fluid flow said internal passage with said front cylinder chamber, a valve control member slidably disposed axially in said piston and associated work member, one end of said valve control member projecting externally of said work member and engageable with said control lever in abutting relation, the other end of said valve control member being positioned to engage in abutting relation said valve element for restricting the flow of fluid from said inlet chamber to said front cylinder chamber, a source of fluid under pressure including fluid return means, an open fluid pressure conduit communicatively connecting said source of fluid under pressure with said rear cylinder chamber and said inlet chamber, a fluid discharge conduit in fluid communication with the return means of said source of fluid under pressure and said front cylinder chamber, said piston and associated work member being urged in one direction responsive to engagement of said valve control member with said valve element to restrict the flow of fluid from said inlet chamber to said front cylinder chamber until at least one of said transverse holes of said sleeve member registers with said inlet chamber thereby re-establishing the flow of fluid from said inlet chamber to said front cylinder chamber for snubbing the movement of said piston and associated work member.

8. A one-way acting fluid operated servo-motor comprising a casing having a reciprocable work member including a piston therein, one end of said work member projecting through said casing, a front cylinder chamber disposed in said casing adjacent one side of said piston and a rear cylinder chamber disposed adjacent the opposite side of said piston, a source of fluid pressure including fluid return means, an open fluid pressure conduit communicatively connecting for fluid flow said rear cylinder chamber with said source of fluid under pressure, a fluid discharge conduit communicatively connecting said front cylinder chamber with said return means of said source of fluid under pressure, an inlet chamber disposed in said casing communicatively connected for fluid flow with said source of fluid under pressure, an externally mounted manually operable control lever, a valve control member slidably disposed for axial movement in said work member, one end of said control valve member extending outside said work member and being in operative relation with said control lever, an internal bore disposed adjacent to said inlet chamber and said front cylinder chamber, a movable sleeve member slidably disposed in said internal bore, the rearward end of said sleeve member being positioned to engage said piston in abutting relation, an internal fluid passage disposed in said sleeve member adapted to communicate for fluid flow said inlet chamber with said front cylinder chamber, a valve element disposed in said sleeve member, said valve element being engageable with said sleeve member for restricting flow of fluid from said inlet chamber to said front cylinder chamber, the other end of said valve control element being engageable with said valve element in abutting relation, means provided in said sleeve member registerable with said internal bore for communicatively connecting for fluid flow said inlet chamber with said front cylinder chamber independently of said valve element to snub the movement of said piston and work member in one direction when said piston approaches the limit of its power stroke, said servo-motor being energized for urging said piston and work member in one direction when said valve control member is moved in the same direction thereby engaging said valve element with said sleeve member to restrict flow of fluid from said inlet chamber to said front cylinder chamber and alternately when said valve control member is unrestrained for disengaging said valve element from said sleeve member whereby fluid flow from said inlet chamber is unrestricted thereby de-energizing said servo-motor.

9. A one-way acting servo-motor comprising a casing, a reciprocable work member including a piston disposed axially in said casing, one end of said work member projecting externally of said casing, a source of fluid pressure including fluid return means therefor, an inlet chamber disposed in said casing, an open fluid pressure conduit communicatively connecting one side of said piston and inlet chamber with said source of fluid pressure, an open fluid discharge conduit communicatively connected to the other side of said piston, a movable sleeve member disposed in said casing positioned to engage said piston in abutting relation, an internal passage disposed in said sleeve member in communicative connection with said inlet chamber and said discharge conduit, means provided in said sleeve member comprising longitudinally spaced apertures in registerable relation with said inlet chamber and the other side of said piston for by-passing fluid under pressure from said inlet chamber to the other side of said piston for snubbing the movement of said work member when said piston approaches its forward limit, externally operable valve means associated with said sleeve member, said valve means being operable to restrict the flow of fluid through said internal passage for energizing said piston in one direction and alternately operable to discharge fluid through said internal passage for de-energizing said piston.

References Cited in the file of this patent

UNITED STATES PATENTS

| | | |
|---|---|---|
| 1,824,034 | Cady | Sept. 22, 1931 |
| 1,888,091 | Oberhoffken | Nov. 15, 1932 |
| 1,890,010 | Vickers | Dec. 6, 1932 |
| 2,002,315 | Furgason | May 21, 1935 |
| 2,007,423 | Davis | July 29, 1935 |
| 2,201,612 | Fields | May 21, 1940 |
| 2,219,518 | Engle et al. | Oct. 29, 1940 |
| 2,259,871 | Baker et al. | Oct. 21, 1941 |
| 2,392,729 | Edge | Jan. 8, 1946 |